United States Patent
Frolov et al.

(10) Patent No.: US 6,501,874 B1
(45) Date of Patent: Dec. 31, 2002

(54) DISPERSION COMPENSATOR USING BRAGG GRATINGS IN TRANSMISSION

(75) Inventors: Sergey Frolov, Berkeley Heights, NJ (US); Joseph Shmulovich, New Providence, NJ (US); Tek-Ming Shen, Westfield, NJ (US)

(73) Assignee: Inplane Photonics, Inc., South Plainfield, NJ (US)

( * ) Notice: Subject to any disclaimer, the term of this patent is extended or adjusted under 35 U.S.C. 154(b) by 0 days.

(21) Appl. No.: 09/963,102

(22) Filed: Sep. 25, 2001

(51) Int. Cl.[7] .................................................. G02B 6/42
(52) U.S. Cl. ........................................ 385/27; 359/110
(58) Field of Search .............................. 385/24–40, 12; 359/110, 130, 337.1, 337.2, 247, 160, 177, 337; 372/20

(56) References Cited

U.S. PATENT DOCUMENTS

| | | | | |
|---|---|---|---|---|
| 5,978,131 A | * | 11/1999 | Lauzon et al. | 359/160 |
| 5,982,791 A | * | 11/1999 | Sorin et al. | 359/247 |
| 6,055,348 A | * | 4/2000 | Jin et al. | 359/130 |
| 6,330,383 B1 | * | 12/2001 | Cai et al. | 359/130 |
| 6,351,323 B1 | * | 2/2002 | Onaka et al. | 359/110 |
| 6,411,429 B1 | * | 6/2002 | Tomofuji et al. | 359/337 |

* cited by examiner

*Primary Examiner*—Akm E. Ullah
(74) *Attorney, Agent, or Firm*—Mayer Fortkort & Williams, PC; Stuart H. Mayer, Esq.

(57) ABSTRACT

An apparatus is provided to compensate for dispersion in a transmission medium. The apparatus includes an input port for receiving a WDM optical signal having a plurality of signal wavelengths and a first Bragg transmission grating receiving the WDM optical signal from the input port. The first Bragg transmission grating has non-zero dispersion at at least one of the signal wavelengths. The first Bragg transmission grating also has a Bragg wavelength that is chosen so that all of the plurality of signal wavelengths lie outside of a reflection band of the first Bragg transmission grating. A second Bragg transmission grating, which is optically coupled to the first Bragg transmission grating, has a non-zero dispersion at at least one of the signal wavelengths. The second Bragg transmission grating also has a Bragg wavelength that is selected so that all of the plurality of signal wavelengths lie outside of a reflection band of the second Bragg transmission grating. Finally, an output port is provided for receiving the optical signal from the second Bragg grating and communicating the optical signal to an external source.

70 Claims, 6 Drawing Sheets

DISPERSION TUNING CURVE OF THREE DIFFERENT GRATINGS WITH THE SAME EFFECTIVE LENGTH

DISPERSION COMPENSATOR USING BRAGG GRATINGS IN TRANSMISSION

FIELD OF THE INVENTION

The present invention relates generally to dispersion compensators that are employed in optical communication systems, and more particularly to a dispersion compensator that employs Bragg gratings operating in transmission.

BACKGROUND OF THE INVENTION

Optical wavelength division multiplexing (WDM) has gradually become the standard backbone networks for fiber optic communication systems. WDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM technology.

One phenomenon that has an adverse effect on the quality of a WDM optical-signal is chromatic dispersion, in which the index of refraction of the transmission medium is dependent on wavelength. Chromatic dispersion causes the different wavelengths of a signal to undergo different phase shifts, resulting in spreading or broadening of the signal, which can give rise to transmission errors.

One dispersion compensation approach employs a Bragg fiber grating, which comprises a length of optical fiber having a series of perturbations in the refractive index that are spaced along the fiber length. The gratings are sometimes classified by the distribution of the index perturbations along the fiber axis. For example, certain fiber gratings may be classified as uniform, in which the perturbations are equally spaced from one another, chirped, in which the spacing between successive perturbations decreases, or apodized, in which the magnitude of the perturbations vary in accordance with some function of position along the fiber.

Conventional fiber Bragg gratings are typically fabricated by providing an optical fiber with one or more dopants sensitive to ultraviolet light, such as fibers having cores doped with germanium oxide, and exposing the fiber at periodic intervals to high intensity ultraviolet light from an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

Conventional dispersion compensators often employ chirped fiber grating operating in a reflection mode so that the different wavelengths in the signal are reflected at different positions along the grating, causing the different wavelengths to experience different path lengths. FIG. 1 schematically depicts such a dispersion compensator. In operation, an input signal 20 enters input port 23 of a circulator 22, exits circulator port 24, propagates towards chirped grating 11, from which it is reflected, enters circulator port 24, and exits the circulator at port 25. If the distances between the index perturbations in the grating are properly matched to the wavelengths of the optical signal, the resulting wavelength-dependent delays will negate the dispersion in output signal 21.

While the results from dispersion compensators employing reflection-based fiber gratings are typically satisfactory, they have a number of disadvantages. In particular, such dispersion compensators require components external to the fiber itself such as the aforementioned circulator. This gives rise to additional losses beyond those inherent in the fiber and also prevents the device from being easily integrated on a planar waveguide.

Dispersion compensators using fiber gratings in transmission have been proposed to overcome some of the problems of fiber gratings used in reflection. For example, a transmission-based dispersion compensator using an apodized, unchirped fiber Bragg grating is discussed in N. M. Litchinitser, B. J. Eggleton, and D. B. Patterson, J. of Lightwave Technology 15, no.8, pp. 1303–1313 (1997), and K. Hinton, J. of Lightwave Technology 16, no.12, pp. 2336–2346 (1998). Such a dispersion compensator can overcome a number of the aforementioned limitations of dispersion compensators that employ gratings operating in reflection. For example, they are compatible with planar integrated optics technology, have relatively low insertion loss, and have no inherent group delay ripple. Nevertheless, there remains a need to develop an improved dispersion compensator that employs an apodized fiber grating operating in transmission that has performance characteristics which allow it to be used in practical optical communication systems.

SUMMARY OF THE INVENTION

In accordance with the present invention, an apparatus is provided to compensate for dispersion in a transmission medium. The apparatus includes an input port for receiving a WDM optical signal having a plurality of signal wavelengths and a first Bragg transmission grating receiving the WDM optical signal from the input port. The first Bragg transmission grating has non-zero dispersion at at least one of the signal wavelengths. The first Bragg transmission grating also has a Bragg wavelength that is chosen so that all of the plurality of signal wavelengths lie outside of a reflection band of the first Bragg transmission grating. A second Bragg transmission grating, which is optically coupled to the first Bragg transmission grating, has a non-zero dispersion at at least one of the signal wavelengths. The second Bragg transmission grating also has a Bragg wavelength that is selected so that all of the plurality of signal wavelengths lie outside of a reflection band of the second Bragg transmission grating. Finally, an output port is provided for receiving the optical signal from the second Bragg grating and communicating the optical signal to an external source.

In accordance with one aspect of the invention, the first and second Bragg transmission gratings may be unchirped, apodized gratings.

In accordance with another aspect of the invention, a method is provided for compensating for dispersion that arises in an optical transmission path. The method begins by receiving an optical signal traveling along the transmission path. The optical signal is successively transmitted through a plurality of Bragg gratings that each have non-zero dispersion at at least one signal wavelength of the optical signal.

In accordance with another aspect of the invention, a tunable dispersion compensator is provided for compensating for dispersion in a transmission medium. The dispersion compensator includes an input port for receiving a WDM optical signal having a plurality of signal wavelengths and a tunable Bragg transmission grating having a selectively adjustable value of dispersion that receives the WDM optical signal from the input port. The tunable Bragg transmission grating also has a non-zero dispersion at at least one of the signal wavelengths and a Bragg wavelength that is selected so that all of the plurality of signal wavelengths lie outside of a reflection band of the Bragg transmission grating. An output port is provided for receiving the optical signal from the tunable Bragg grating and for communicating the optical signal to an external source.

DETAILED DESCRIPTION

Figure 1:
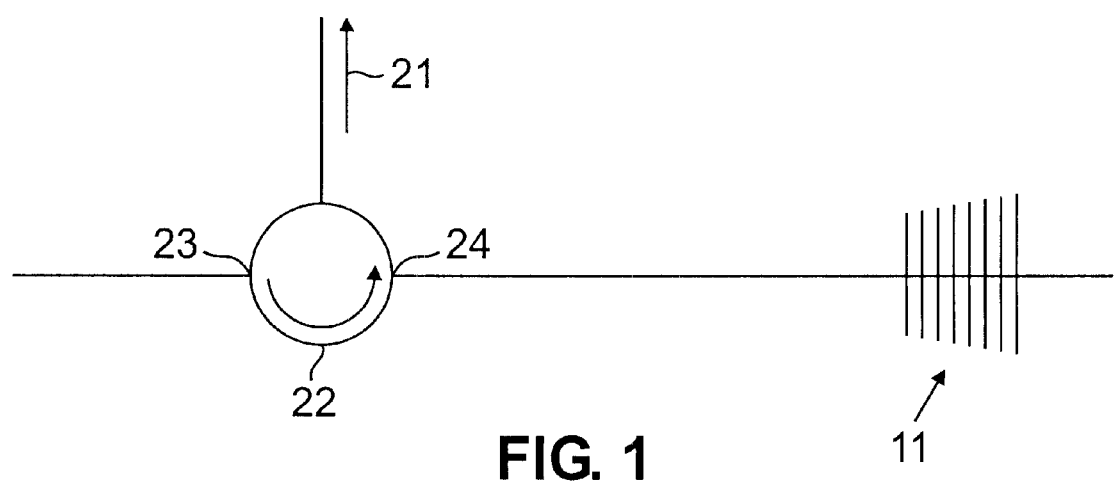
FIG. 1 shows a schematic diagram of a conventional dispersion compensator.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

THEORETICAL MODEL

In order to facilitate a better understanding of the present invention and the inherent tradeoffs that need to be considered when designing a dispersion compensator, a model of a transmission-based Bragg grating dispersion compensator will first be presented.

It is well-known that chromatic dispersion can be characterized by a frequency dependent phase shift $\phi(\omega)$. The first derivative of the spectral phase with respect to the frequency is known as the group delay $$\tau = -\frac{\partial \phi(\omega)}{\partial \omega}. \tag{1}$$

When a light pulse propagates through a medium with a linear phase response the pulse only gets delayed and is not distorted (such a medium can be thought of as a linear phase filter). Accordingly, in optical communication systems, higher order derivatives of the spectral phase need to be considered. The second derivative is known as quadratic dispersion and is given by $$D = \frac{\partial \tau(\lambda)}{\partial \lambda}, \tag{2}$$

where the $2^{nd}$ derivative is taken with respect to wavelength $\lambda$, rather than $\omega$.

Another frequently used term is the quadratic dispersion per unit length, which is given by $$\beta_2 = -\frac{1}{L}\frac{\partial^2 \phi(\omega)}{\partial \omega^2} = \frac{1}{L}\frac{\partial \tau(\omega)}{\partial \omega} \tag{3}$$

where L is the length of the propagation medium (e.g., the fiber length).

These parameters are related to each other via following relationship:

$$D = -\frac{2\pi c}{\lambda^2}\beta_2 L. \tag{4}$$

In a wavelength division multiplexed (WDM) system, when considering only a single channel located at one wavelength, quadratic dispersion dominants and higher order derivatives have negligible effect. Quadratic dispersion causes a broadening in time of the waveform so that neighboring pulses extend into each others timeslots. This phenomenon, which is also called intersymbol interference, makes it difficult for the receiver to make a correct determination of what signal was sent, thus causing transmission errors. The next derivative is called cubic dispersion or dispersion slope and is given by $$S = \frac{\partial D(\lambda)}{\partial \lambda}, \tag{5}$$

Another frequently used parameter, slope per unit length, is given by $$\beta_3 = -\frac{1}{L}\frac{\partial^3 \phi(\omega)}{\partial \omega^3} = \frac{1}{L}\frac{\partial \beta_2(\omega)}{\partial \omega}. \tag{6}$$

They are related via $$S = \left(\frac{2\pi c}{\lambda^2}\right)^2 \beta_3 L + \frac{4\pi c}{\lambda^3}\beta_2 L. \tag{7}$$

The dispersion slope is usually considered when the bandwidth over which the dispersion compensator operates is large, such as, for example when it needs to compensate for dispersion over many channels simultaneously. In contrast, a dispersion compensator that operates over a single channel is inherently narrowband and typically needs to compensate only for quadratic dispersion.

Before considering an apodized grating, a uniform Bragg grating of infinite length will be considered. The infinite Bragg grating is characterized by a period $\Lambda_B$, a mode index n, and a coupling coefficient κ. The radial Bragg frequency $\omega_B$ is given by $\pi c/\Lambda_B$ and $\lambda_B$ is the Bragg wavelength given by $2n\Lambda_B$. A Bragg grating is characterized by a reflection band, also called a stop-band, which is a spectral range of wavelengths within which a light signal is reflected back. The remaining spectral range is called the passband of a grating; an optical signal at a passband wavelength will travel through the grating without being reflected.

The quadratic and cubic dispersion terms outside the stopband of a Bragg grating are respectively given by $$\beta_2 = -\left(\frac{n}{c}\right)^2 \frac{1}{\delta} \frac{(\kappa/\delta)^2}{(1-(\kappa/\delta)^2)^{3/2}}, \quad (8)$$

$$\beta_2 = 3\left(\frac{n}{c}\right)^3 \frac{1}{\delta^2} \frac{(\kappa/\delta)^2}{(1-(\kappa/\delta)^2)^{5/2}} \quad (9)$$

where δ is the frequency detuning parameter given by $\delta=(\omega-\omega_B)/c$.

Eqs. 8 and 9 have a unique solution, i.e. a set of κ and δ for a given set of $\beta_2$ and $\beta_3$. The latter parameters are in turn given by a set of specified D, S and L according to Eqs. 4 and 7. Therefore, one can achieve compensation of arbitrarily high dispersion D with arbitrarily low dispersion slope S using this approach. However, it is not clear that this approach to dispersion compensation can also produce tunable dispersion compensation, i.e. variable D characterized by a dynamic range comparable to the absolute maximum value of D. It will be demonstrated below that a transmission grating can be used to provide not only fixed dispersion compensation, but also tunable dispersion compensation.

In general, the dispersion of the transmission grating can be tuned by varying either the Bragg wavelength $\lambda_B$, the coupling coefficient κ, or the total grating length L. Among these alternatives, varying the Bragg wavelength is the most practical way of controlling the grating transmission. There are two well-known methods available for varying $\lambda_B$. Mechanical stretching is a good way of varying $\lambda_B$ over a wide spectral range in a fiber grating; however, this method cannot be easily extended to gratings written in planar waveguides. Temperature tuning, on the other hand, is a more broadly applicable mechanism of controlling $\lambda_B$. When the temperature T of the grating is varied, its effective refractive index changes and thus shifts the Bragg resonance. In silica $dn/dT=10^{-5}$ K$^{-1}$, which results in $\delta\lambda/\lambda_B=10^{-3}$ for δT of 100K. For the C-band ($\lambda_B\sim1.55$ μm) this will lead to a tuning range of about 1.5 nm. This estimate implies, for example, that for a tunable dispersion range (ΔD) of 1000 ps/nm a dispersions compensator should have a dispersion slope S of about 667 ps/nm$^2$. Thus, a higher dispersion slope results in greate tunability.

Figure 2:
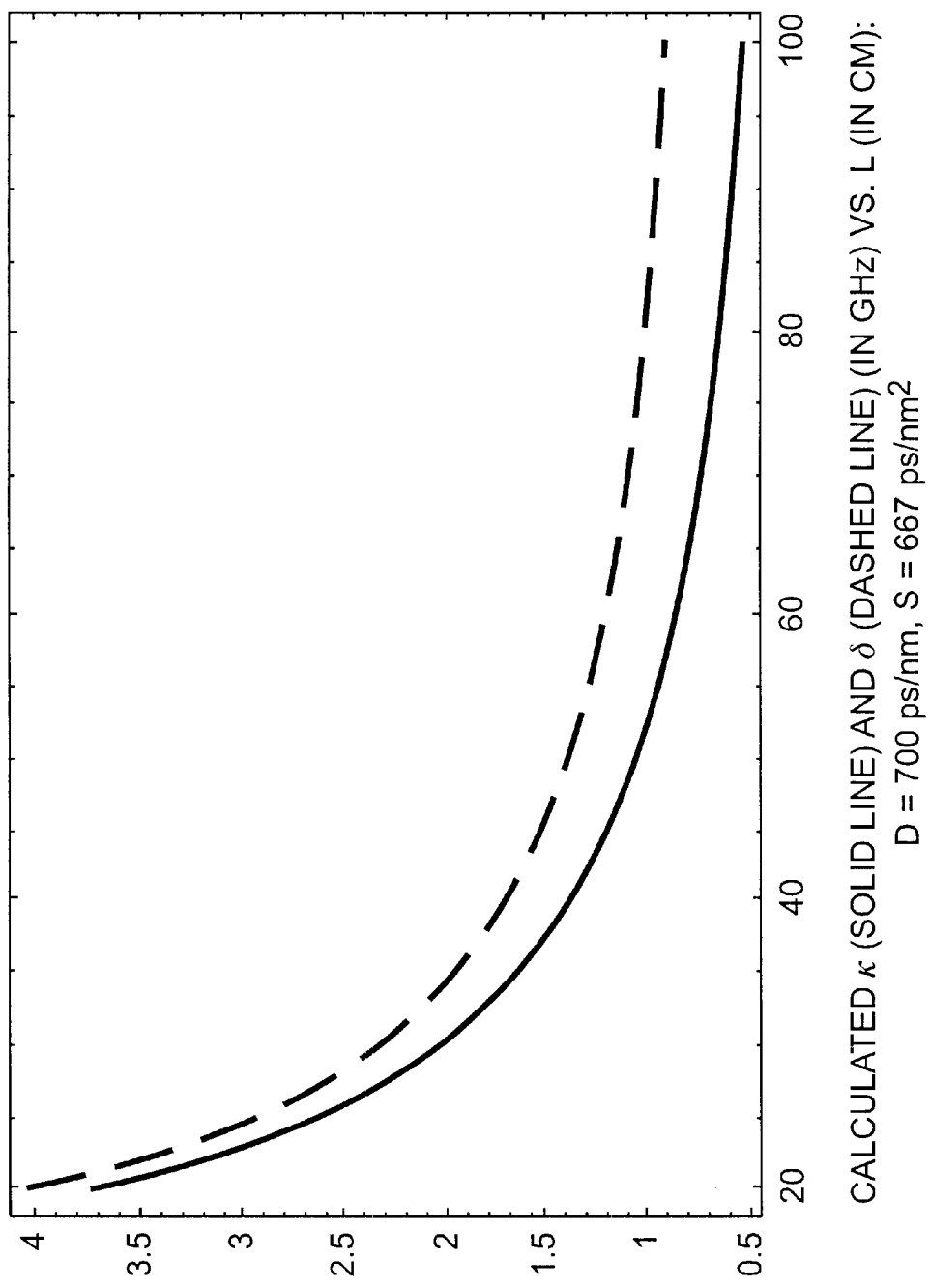
FIG. 2 graphically illustrates numerical results of the coupling coefficient (solid line) and the frequency detuning parameter (dashed line) as a function of grating length for a dispersion slope of 667 ps/nm$^2$.
Figure 3:
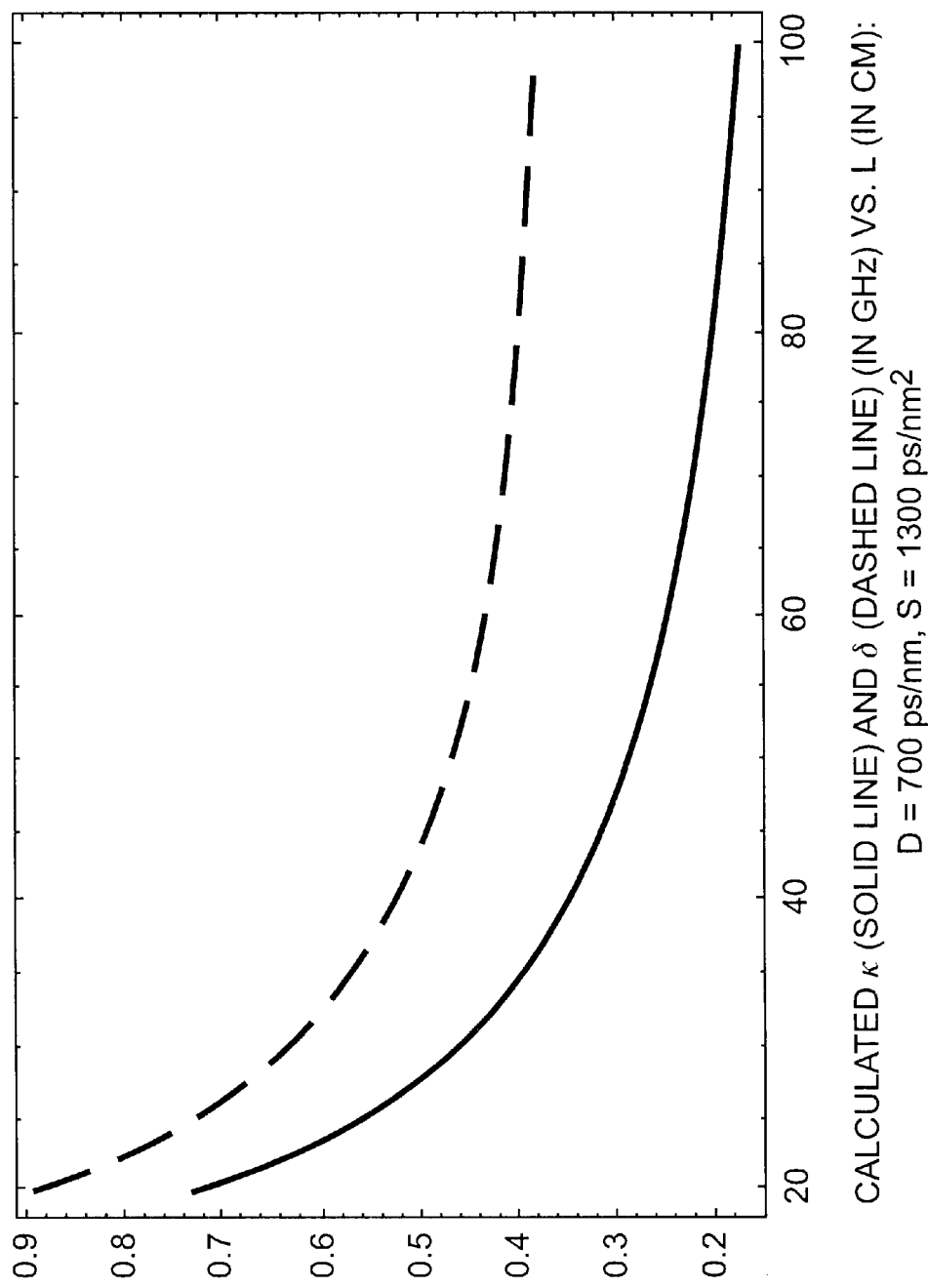
FIG. 3 graphically illustrates numerical results for the coupling coefficient (solid line) and the frequency detuning parameter (dashed line) as a function of grating length for a dispersion slope of 1300 ps/nm$^2$.
Figure 4:
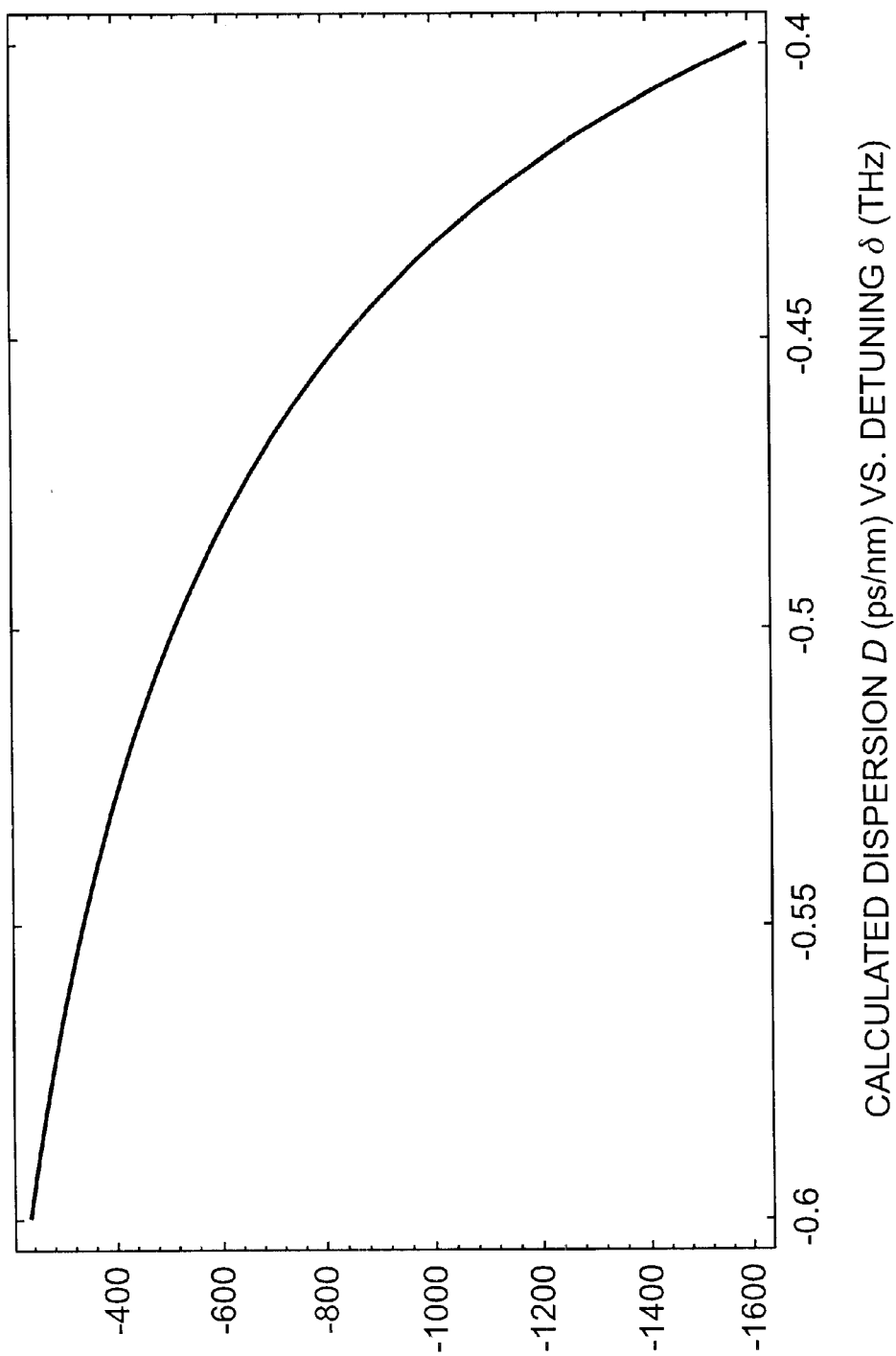
FIG. 4 graphically illustrates the numerical results for the dispersion as a function of the frequency detuning parameter.

FIG. 2 shows the solutions of Eqs. 8 and 9 for L from 20 to 100 cm, when D and S are set at 700 ps/nm and 667 ps/nm$^2$ (n=1.46), respectively. For example, the solution at L=100 cm is κ=114 cm$^{-1}$ and δ=189 cm$^{-1}$, which corresponds to 0.54 THz and 0.9 THz, respectively. Gratings of such strength are difficult to obtain in fibers by photo-induced refractive index changes, but can be achieved in planar waveguides by etching. Nevertheless, achieving such a strong grating even in etched waveguides may still be difficult: to compromise, one can increase the dispersion slope. For example, the same dispersion with S=1300 ps/nm$^2$ can be achieved using substantially weaker gratings as shown in FIG. 3. The dispersion slope of 1300 ps/nm$^2$ results in additional group delay distortion of about $S\Delta^2/2 =$ 6.5 ps, where Δ=0.1 nm is the bandwidth of an optical WDM carrier at 10 Gb/s. This is well within the 50 ps time slot of a 10 Gb/s signal (RZ or Return-to-Zero format), and thus results in a negligible penalty due to higher order dispersion contributions. For a grating with L=50 cm, FIG. 3 shows that κ is equal to 284 THz. FIG. 4 shows the resulting dispersion tuning curve, which demonstrates there there is a tuning range of −1600 to −300 ps/nm with the maximum cubic dispersion distortion of 22 ps, which is still acceptable at 10 Gb/s.

In summary, the present inventors have shown that transmission gratings can be used for dispersion compensation of arbitrary magnitude with arbitrary small contribution from higher order dispersion terms. Furthermore, these gratings can also provide tunable dispersion, so that the magnitude of dispersion compensation can be continuously varied using available and well-understood means of control, e.g., temperature control. The present inventors have also realized that the resulting penalty from higher order dispersion terms is negligible for current optical network transmission rates and formats.

NUMERICAL RESULTS

In practice, gratings have a finite length L, which leads to unwanted reflections in the grating's passband. In order to eliminate these reflections, the grating can be apodized, so that the coupling coefficient becomes a smooth function of the grating coordinate and becomes negligibly small at the ends of the grating. Various apodization functions can be applied, e.g. the gaussian apodization produces the following grating profile: $\kappa(x)=\kappa_0\exp(-x^2/\xi_0^2)$, where $\xi_0$ is the characteristic grating length, whereas the raised cosine profile is given by $\kappa(x)=\kappa_0(1+\cos(2\pi x/L))/2$, where the grating extends from −L/2 to L/2. Different methods can be used to calculate the response of such nonuniform gratings. In the following analysis a piecewise-uniform approach is employed (see T. Erdogan, J. of Lightwave Technology 15, no.8, pp. 1277–1294, 1997) in which a grating is divided into N number of small uniform pieces of constant length $l_g$ (L=Nl$_g$) and varying $\kappa_i$ (i=1, ... N), where $\kappa_i=\kappa[(i-1/2)l_g]$. The transmission response of each uniform section is given by the matrix $M_i$:

$$M_i = \begin{bmatrix} \cosh(\gamma_i l_g) - i\frac{\delta}{\gamma_i}\sinh(\gamma_i l_g) & -i\frac{\kappa_i}{\gamma_i}\sinh(\gamma_i l_g) \\ i\frac{\kappa_i}{\gamma_i}\sinh(\gamma_i l_g) & \cosh(\gamma_i l_g) + i\frac{\delta}{\gamma_i}\sinh(\gamma_i l_g) \end{bmatrix}, \quad (10)$$

where $\gamma_i = \sqrt{\kappa_i^2 - \delta_i^2}$.

The response of the whole grating is obtained by multiplying the matrices of all sections: $M=M_N \ldots M_i \ldots M_1$. As a result, the inputs and outputs are related via:

$$\begin{pmatrix} R_N \\ S_N \end{pmatrix} = M \begin{pmatrix} R_0 \\ S_0 \end{pmatrix}, \quad (11)$$

where $R_0$ and $S_0$ are respectively the amplitudes of the forward and backward going waves at the input of the grating, and $R_N$ and $S_N$ are those at the output. For a lossless grating we have det(M)=1. Then the transmission and reflection functions are respectively given by:

$$T = \frac{R_N}{R_0} = \frac{1}{M_{22}} \text{ and } R = \frac{S_0}{R_0} = -\frac{M_{21}}{M_{22}}. \tag{12}$$

The response of an apodized grating based on the above analysis will be illustrated with a practical example in which the following typical numerical values for the various parameters will be employed: $\lambda_B$=1.55 $\mu$m, $\kappa_0$=61 cm$^{-1}$, $l_g$=50 $\mu$m, and $\kappa(x)$ will be apodized using the raised cosine function.

EXAMPLES

Based on the previous analysis it is clear that long gratings (e.g., 10–100 cm) will often be required to produce an efficient dispersion compensator. Unfortunately, the fabrication of continuous gratings of such length is neither feasible nor practical, particularly when planar optical waveguide technology is employed. However, the present inventors have recognized that one advantage of utilizing a Bragg grating in transmission instead of reflection is that a series of shorter length gratings may be concatenated to form a long transmission grating. In contrast to a grating operating in transmission, a concatenation of gratings operating in reflection can only be achieved if the distance between the individual gratings is carefully selected to ensure that resonances do not arise in what are effectively Fabry-Perot cavities located between adjacent gratings. In contrast, gratings operating in transmission can be concatenated without regard to the distance between the individual gratings. The inventors came to this unexpected conclusion as a result of numerical simulations of realistic transmission gratings.

For purposes of clarity, as used herein the term "reflection grating" will refer to a Bragg grating that is adapted for use in a reflection mode of operation while the term "transmission grating" will refer to a Bragg grating (sometimes also called short-period gratings) that is adapted for use in a transmission mode of operation. This mode of operation implies that all of the optical WDM signals transmitted through this grating have wavelengths that lie outside of the grating stopband. Among the various distinguishing features between these two classes of gratings, a transmission grating is typically configured as a two-port device (an input and output port) whereas a reflection grating is often configured as a three-port device (an input port, an output port for the reflected signal, and an output port for the transmitted signal). The arrangement shown in FIG. 1 is an example of a reflection grating. As used herein the term "transmission grating" and "Bragg transmission grating" are used interchangeably and should not be confused with long-period gratings that are not Bragg gratings, in which coupling occurs between different optical modes traveling in the same direction. Such non-Bragg gratings are sometimes referred to as "transmission gratings" (see, for example, T. Erdogan, J. of Lightwave Technology 15, no.8, pp. 1277–1294, 1997) and are not employed in the present invention.

Figure 6:
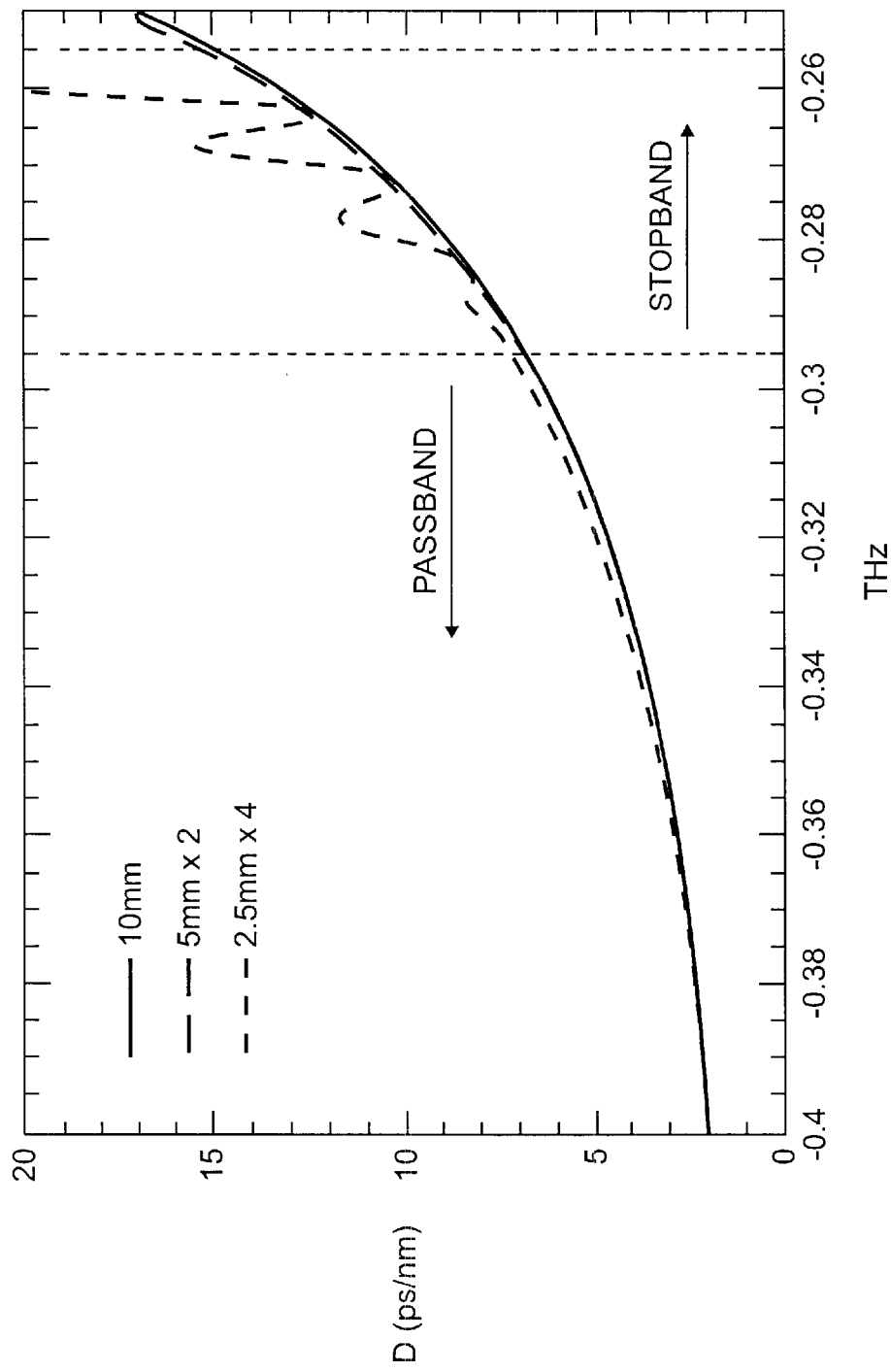
FIG. 6 graphically illustrates numerical results comparing the dispersion of three gratings formed in a planar waveguide with refractive index contrast of 2% and index modulation of about 10%.
Figure 8:
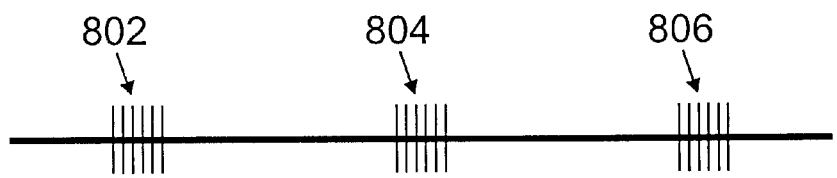
FIG. 8 shows one embodiment of a dispersion compensator in accordance with the present invention in which three Bragg gratings are concatenated.

In accordance with the present invention, the dispersion compensator is formed from a concatenation of two or more transmission gratings. In a preferred embodiment of the invention the transmission gratings are apodized gratings. FIG. 8 shows one such embodiment that includes three apodized transmission gratings 802, 804, and 806. In general, a long transmission grating may combine a large number of individual shorter gratings when these gratings work in a transmission mode. If the gratings are well apodized there will be no additional resonances in the passband. FIG. 6 shows numerical results comparing the dispersion of three gratings formed in a planar waveguide with refractive index contrast of 2% and index modulation of about 10%: the first is a single 10 mm grating, the second is two 5 mm gratings, and the third is four 2.5 mm gratings connected in series. It is evident from FIG. 6 that the passband dispersion of these three different gratings are virtually identical. The dispersion tuning curve in this example is independent of the distances between individual subgratings. This simulation demonstrates that transmission gratings can be concatenated and coupled together in any order and provide the same dispersion compensation, as if it were a single continuous transmission Bragg grating.

As discussed in W. H. Loh, F. Q. Zhou, and J. J. Pan, IEEE Photonics Technology Lett. 11, no.10, pp. 1280–1282 (1999), concatenated Bragg reflection gratings have been previously proposed for use in dispersion compensation modules. These gratings are typically referred to as sampled gratings; they consist of a number of short Bragg gratings, the separation between which has be controlled with high precision. This separation controls the Fabry-Perot resonances that are produced as a result of reflections within the stopband of each individual grating. In order to use the sampled gratings in the aforementioned reference as a dispersion compensator, the gratings must be chirped. As shown in FIG. 8, the transmission gratings can also be concatenated in a way similar to a sampled grating. However, the response, and in particular the dispersion tuning curves, of transmission gratings are surprisingly insensitive to the length of the individual gratings and the distance between them. Furthermore a transmission gratings does not need to be chirped to function as a dispersion compensator. Unlike reflection gratings, the overall phase response of a concatenation of transmission gratings is practically insensitive to the phase errors that may be inadvertently introduced by each individual grating. In addition, as discussed in more detail below, the individual gratings in the concatenated transmission grating may be different from each other, since the net dispersion tuning curve is the algebraic sum of contributions from each individual grating. The present inventors have also found that the separate apodization of each individual grating increases the total passband of the concatenated transmission grating, advantageously improving its phase response and increasing the return loss tolerance.

Referring again to FIG. 8, the gratings 802, 804, and 806 may be formed in fiber or a planar waveguide. For purposes of illustration only and not as a limitation on the invention, a number of embodiments will be presented in which the gratings are formed in a planar waveguide. However, before presenting these embodiments of the invention, a brief review will be presented of the process used to fabricate Bragg gratings in planar waveguides.

Silicon technology is often employed to form doped-silica waveguides or waveguide circuits. Doped-silica waveguides are usually preferred because they have a number of attractive properties including low cost, low loss, stability, and compatibility for coupling to laser diodes, other waveguides, high NA fiber and standard fiber. Such a waveguide is fabricated on a carrier substrate, which typically comprises silicon or silica. The substrate serves as a mechanical support for the otherwise fragile waveguide and it can, if desired, also play the role of the bottom portion of the cladding. In addition, it can serve as a fixture to which input and output fibers are attached so as to optically couple cores of an input/output fiber to the cores of the waveguide. The fabrication process begins by depositing a base or lower cladding layer of low index silica on the carrier substrate (assuming the substrate itself is not used as the cladding layer). A layer of doped silica with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core.

Once the waveguide core has been fabricated in the aforementioned manner, a grating can be fabricated by exposing select portions of the core to radiation to produce a photo-induced refractive-index change. In particular, the grating can be formed by selectively exposing the waveguide core to beams of intense light at locations separated by a distance equal to the period $\Lambda_B$. One preferred exposure source is UV radiation from a KrF excimer laser. Proper spacing can be achieved by exposing through a slit of an appropriate width and then moving the fiber to the next exposure site. Alternatively, the fiber can be exposed to a wide beam from the laser through an amplitude mask providing a series of transparent slits at a spacing $\Lambda_B$.

The grating can be fabricated by means other than a photo-induced refractive index change. For example, in a planar waveguide the waveguide may be etched to modulate its thickness or width to periodically vary its effective refractive index.

Figure 5:
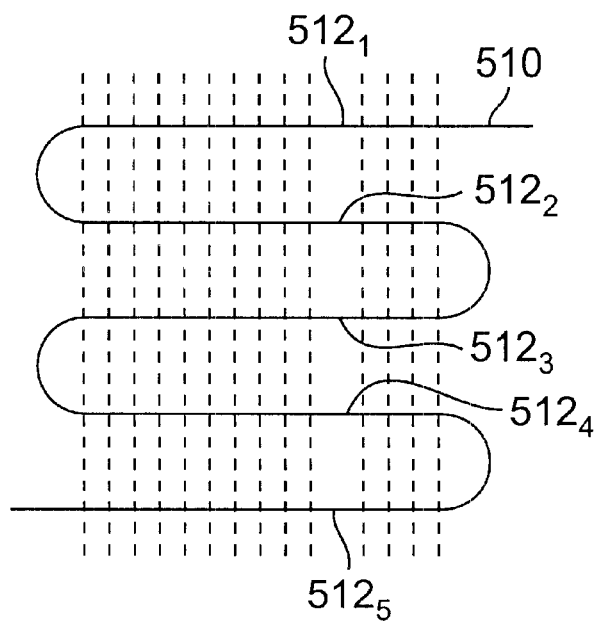
FIG. 5 shows a dispersion compensator in accordance with one embodiment of the present invention in which a concatonation of Bragg transmission gratings are formed in a planar waveguide that crisscrosses over a substrate.
Figure 9:
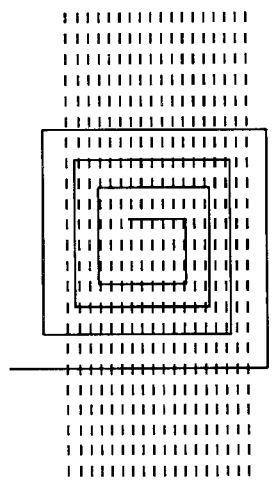
FIG. 9 shows a dispersion compensator in accordance with one embodiment of the present invention in which a concatenation of Bragg transmission gratings are formed in a planar waveguide that is coiled on a substrate.

Returning to the discussion of those embodiments of the invention formed from planar waveguides, instead of a linear concatenation of transmission gratings such as depicted in FIG. 8, in some embodiments of the invention it may be advantageous to concatenate the gratings in a folded or circuitous manner. For example, FIG. 5 shows one embodiment of the invention in which a series of gratings are formed in a planar waveguide 510 that crisscrosses over the substrate. In this example gratings are formed in each linear segment $512_1$–$512_5$ of planar waveguide 510. One significant advantage of this embodiment of the invention is that all the individual gratings may be fabricated simultaneously because a given refractive index perturbation (indicated in FIG. 5 by the dashed lines) can be formed across waveguide segments $512_1$–$512_5$ in a single processing step. Another advantage of this embodiment of the invention is that a long grating can be formed with a relatively small footprint. Of course, circuitous patterns other than the crisscrossed pattern shown in FIG. 5 can be used. For example, FIG. 9 shows a coiled waveguide pattern.

In some embodiments of the invention it may be advantageous to provide the transmission grating with the ability to adjust or tune the dispersion value. In general, the dispersion of the transmission grating can be tuned by varying either the Bragg wavelength, $\lambda_B$, the coupling coefficient $\kappa$, or the effective grating length L. While the present invention encompasses a transmission grating dispersion compensator that can be tuned using any one or more of these parameters, it is relatively straightforward to vary the Bragg wavelength. For example, the temperature T of the grating can be varied to change its effective refractive index and thus shift the Bragg resonance. The grating with L=50 cm and $\kappa$=284 THz has the dispersion curve shown in FIG. 4. As a result, it will provide a single WDM channel with a temperature-tunable, continuous dispersion compensation between –300 and –1600 ps/nm. Alternatively, $\kappa$ can be varied by changing the refractive index of the surrounding cladding layer, when, for example such a layer is composed of a polymer with appropriate index contrast. In addition the effective length of a long concatenated transmission grating can be varied by inserting, for example, optical switches between some of the individual gratings, so that the optical path can be switched and thus the effective length varied.

The above examples primarily focus on a single channel dispersion compensator. However, the invention may also be used with the two nearest channels within a much more limited dispersion compensation range. However, the other channels will not be able to benefit from this particular dispersion compensator. There is an inherent trade-off: the broader the accessible wavelength range of such a dispersion compensator, the lower is its tunability. A dispersion compensator can therefore be provided which has fixed dispersion (or limited tunability), and which operates over a bandwidth of several channels. This requirement implies very low S, which means that stronger gratings have to be used, as seen from FIG. 2. It should be noted that an issue arises concerning what is the practical achievable limit of $\kappa$. For $\Delta$=2% or less, where $\Delta$ is given by $(n_{core-ncladding})/n_{core}$, in the first approximation a $\kappa_{max}$ of about 2 THz can be achieved. This may be sufficient to cover half of the C-band.

A number of potential problems must be addressed when designing a dispersion compensator using transmission gratings. For instance, when strong transmission gratings are employed, losses arising from scattering may become excessive. For this reason it may be preferable to form a single channel dispersion compensator from longer but weaker individual transmission gratings. In this context, the concatenation of several individual transmission grating becomes particularly advantageous because it does not require any special alignment between the individual gratings and in principle, it produces arbitrarily long transmission gratings.

Another potential problem is spurious reflections in the passband, which can create ripples in the phase and amplitude of the transmitted light spectrum. Generally, these reflections should be avoided. A piece-wise numerical analysis suggests that the ripples can be eliminated if the return loss in the passband of the individual subgratings coupled in series is less than about –40 dB. One way to achieve this requirement may be to write blazed gratings, which would reduce the unwanted reflections. An alternative approach is to use the group delay ripples in such a way as to reduce the amount of higher order dispersion, e.g. the third order dispersion, at some signal wavelengths. This approach, however, would result in a higher penalty at some other wavelength and, in addition, would require precise control of the magnitude and position of the ripple.

Yet another potential problem is the dependence of the dispersion on polarization. It is well-known that in a planar waveguide the two fundamental modes are the orthogonally polarized $TE_0$ and $TM_0$ modes. Both $\kappa$ and $\delta$ may differ for these modes. To estimate the scope of the problem with a numerical example using nominal values for L, D and S of 50 cm, –700 ps/nm and 1300 ps/nm$^2$, respectively, the polarization dependent dispersion (PDD) is 3.5 ps/nm for either a $\Delta\delta$ of $10^{-3}$ or a $\Delta\kappa$ of $10^{-3}$ (these are relative $\delta$ and $\kappa$ deviations for TE and TM modes). PDD is roughly 10 times stronger for a $\Delta\delta$ and $\Delta\kappa K$ of $10^{-2}$ or 1% and thus is more of an issue. In planar nonsymmetric waveguides the relative difference between the effective indices for the TE and TM modes ($\Delta n/n$) is expected to be about $10^{-4}$ or less. If the waveguide height h is smaller than its width w, then $n_{eff}(TE_0) > n_{eff}(TM_0)$ (note that the effect will be the opposite when h is greater than w). As a result, the Bragg wavelength of the TM modes will be shorter than that of the TE modes, such that $\Delta\lambda/\lambda=\Delta n/n$. Therefore, $|\delta|$ for the TM mode will be larger than that of the TE mode; the relative difference between them for $\delta$ of −0.3 THz is about 0.5%. To account for the polarization dependence of the grating strength $\kappa$, the relative benefits of photo-induced gratings, which have relatively small polarization dependence, and etched gratings must be considered. While etched gratings are more attractive since they can be made much stronger than photo-induced grating, they are also much more polarization sensitive: the higher the index contrast $\Delta$ between the core and the cladding, the higher the grating polarization dependence. The relative polarization-induced difference $\Delta\kappa/\kappa$ is about 0.9% for $\Delta=0.6\%$ and 2.8% for $\Delta=2\%$. If a top-etched grating is used, $\kappa$ will be greater for the TM mode. If a side-wall-etched grating is used, $\kappa$ will be lower for the TM mode. This implies that PMD can be managed by counteracting the effects caused by changes in polarization-dependent $\kappa$ and $\delta$. For example, in a top-etched waveguide with h<w, h and w can be chosen so that the PMD-induced shift in $\delta$ compensates for the similar change in $\kappa$, resulting in a net zero PDD.

Figure 7:
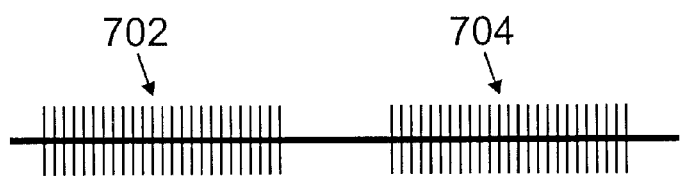
FIG. 7 shows an embodiment of the present invention in which two different transmission gratings are concatenated to compensate for polarization dependent dispersion.

An alternative way of compensating for PDD is to concatenate two different types of gratings. For example, in FIG. 7, the first grating 702 can be designed so that its PDD opposes that of the second grating 704 over a sufficiently large bandwidth. It should be noted that the ability to serially concatenate transmission gratings can be more generally exploited by combining individual gratings that differ in ways other than their PDD. For example, transmission gratings that have different Bragg wavelengths may be used so that dispersion compensation can be provided to different channels. As another example, transmission gratings having different dispersion slopes can be concatenated.

The foregoing discussion has focused on the long wavelength side of the transmission gratings, which limits the accessible range of dispersion to negative values. By using the short wavelength side, the dispersion can also be tuned across the range of positive values with a similar set of tolerances. However, in this wavelength range a flat amplitude response is no longer guaranteed because of scattering from the core into the cladding. Thus a specially designed transmission gratings are required for use in the short wavelength range of the passband.

What is claimed is:

1. A dispersion compensator for compensating for dispersion in a transmission medium, comprising:
   an input port for receiving a WDM optical signal having a plurality of signal wavelengths;
   a first Bragg transmission grating having non-zero dispersion at at least one of the signal wavelengths and having a Bragg wavelength so that all of the plurality of signal wavelengths lie outside of a reflection band of the first Bragg transmission grating, said first Bragg transmission grating receiving the WDM optical signal from the input port;
   a second Bragg transmission grating optically coupled to the first Bragg transmission grating, a second Bragg transmission grating having non-zero dispersion at at least one of the signal wavelengths and having a Bragg wavelength so that all of the plurality of signal wavelengths lie outside of a reflection band of the second Bragg transmission grating; and
   an output port for receiving the optical signal from the second Bragg grating and communicating the optical signal to an external source.

2. The dispersion compensator of claim 1 wherein at least one of the first and second Bragg transmission gratings is an apodized grating.

3. The dispersion compensator of claim 1 wherein at least one of the first and second Bragg transmission grating is an unchirped grating.

4. The dispersion compensator of claim 1 wherein said first and second Bragg transmission gratings are unchirped, apodized gratings.

5. The dispersion compensator of claim 1 further comprising an optical transmission path along which the first and second Bragg gratings are located, said first and second Bragg gratings being located at positions along the optical transmission path that are selected independently of one another.

6. The dispersion compensator of claim 5 wherein a distance between the first and second Bragg gratings is greater than the Bragg wavelength.

7. The dispersion compensator of claim 5 wherein a distance between the first and second Bragg gratings is selected independently of grating parameters that include a Bragg wavelength.

8. The dispersion compensator of claim 1 wherein the first and second Bragg gratings are fiber Bragg gratings.

9. The dispersion compensator of claim 1 wherein the first and second Bragg gratings are planar waveguide Bragg gratings.

10. The dispersion compensator of claim 9 wherein the first and second Bragg gratings are located in a common planar waveguide formed on a common substrate, said common planar waveguide being arranged in a circuitous path.

11. The dispersion compensator of claim 10 wherein said circuitous path crisscrosses over the common substrate.

12. The dispersion compensator of claim 11 wherein said first and second Bragg gratings are located on linear segments of the crisscrossed circuitous path that are parallel to one another.

13. The dispersion compensator of claim 10 wherein said circuitous path is a coiled path.

14. The dispersion compensator of claim 10 wherein said first and second Bragg transmission gratings are unchirped, apodized gratings.

15. The dispersion compensator of claim 12 wherein said first and second Bragg transmission gratings are unchirped, apodized gratings.

16. The dispersion compensator of claim 1 wherein the first and second Bragg gratings comprise "N" Bragg gratings, where "N" is an integer between 3 and 100.

17. The dispersion compensator of claim 1 wherein said first and second Bragg gratings have photo-induced perturbations in refractive index.

18. The dispersion compensator of claim 9 wherein said first and second Bragg gratings are etched waveguides having a periodic modulation in thickness or width.

19. The dispersion compensator of claim 1 wherein at least one of the first or second Bragg gratings are tunable Bragg gratings having an adjustable value of dispersion.

20. The dispersion compensator of claim 19 wherein the tunable Bragg grating has a variable Bragg wavelength.

21. The dispersion compensator of claim 20 wherein the tunable Bragg grating is tunable by temperature control of the tunable Bragg grating.

22. The dispersion compensator of claim 1 wherein said first and second Bragg gratings have polarization dependent dispersion (PDD) values that differ from one another.

23. The dispersion compensator of claim 1 wherein said first and second Bragg gratings have Bragg wavelengths that differ from one another.

24. A method of compensating for dispersion arising in an optical transmission path, said method comprising the steps of:

receiving an optical signal traveling along the transmission path; and successively transmitting the optical signal through a plurality of Bragg gratings each having non-zero dispersion at at least one signal wavelength of the optical signal.

25. The method of claim 24 wherein said plurality of Bragg gratings are apodized grating.

26. The method of claim 24 wherein said plurality of Bragg gratings are unchirped grating.

27. The method of claim 24 wherein said plurality of Bragg gratings are unchirped, apodized gratings.

28. The method of claim 24 further comprising an optical transmission path along which the plurality of Bragg gratings are located, adjacent ones of said Bragg gratings being located at positions along the optical transmission path that are selected independently of one another.

29. The method of claim 28 wherein a distance between the adjacent Bragg gratings is greater than the Bragg wavelength.

30. The method of claim 28 wherein a distance between the adjacent Bragg gratings is selected independently of grating parameters that include the Bragg wavelength.

31. The method of claim 24 wherein the plurality of Bragg gratings are fiber Bragg gratings.

32. The method of claim 24 wherein the plurality of Bragg gratings are planar waveguide Bragg gratings.

33. The method of claim 32 wherein the plurality of Bragg gratings are located in a common planar waveguide formed on a common substrate, said common planar waveguide being arranged in a circuitous path.

34. The method of claim 33 wherein said circuitous path crisscrosses over the common substrate.

35. The method of claim 34 wherein said plurality of Bragg gratings are located on linear segments of the crisscrossed circuitous path that are parallel to one another.

36. The method of claim 33 wherein said circuitous path is a coiled path.

37. The method of claim 33 wherein said plurality of Bragg gratings are unchirped, apodized gratings.

38. The method of claim 35 wherein said plurality of Bragg gratings are unchirped, apodized gratings.

39. The method of claim 24 wherein said plurality of Bragg gratings comprise "N" Bragg gratings, where "N" is an integer between 3 and 100.

40. The method of claim 24 wherein said plurality of Bragg gratings have photo-induced perturbations in refractive index.

41. The method of claim 32 wherein said plurality of Bragg gratings are etched waveguides having a periodic modulation in thickness or width.

42. The method of claim 24 wherein at least one of the plurality of Bragg gratings is a tunable Bragg grating having an adjustable value of dispersion.

43. The method of claim 42 wherein the tunable Bragg grating has a variable Bragg wavelength.

44. The method of claim 43 wherein the tunable Bragg grating is tunable by temperature control.

45. The method of claim 24 wherein said plurality of Bragg gratings have polarization dependent dispersion (PDD) values that differ from one another.

46. The method of claim 24 wherein said plurality of Bragg gratings have Bragg wavelengths that differ from one another.

47. A tunable dispersion compensator for compensating for dispersion in a transmission medium, comprising:

an input port for receiving a WDM optical signal having a plurality of signal wavelengths;

a tunable Bragg transmission grating having a selectively adjustable value of dispersion and having non-zero dispersion at at least one of the signal wavelengths, said Bragg transmission grating further having a Bragg wavelength so that all of the plurality of signal wavelengths lie outside of a reflection band of the Bragg transmission grating, said Bragg transmission grating receiving the WDM optical signal from the input port;

an output port for receiving the optical signal from the Bragg grating and communicating the optical signal to an external source.

48. The tunable dispersion compensator of claim 47 wherein said Bragg transmission grating is an apodized grating.

49. The tunable dispersion compensator of claim 47 wherein said Bragg transmission grating is an unchirped grating.

50. The tunable dispersion compensator of claim 47 wherein said Bragg transmission grating is an unchirped, apodized grating.

51. The tunable dispersion compensator of claim 47 further comprising a plurality of tunable Bragg gratings optically coupled to one another and situated along an optical transmission path, said plurality of Bragg gratings being located at positions along the optical transmission path that are selected independently of one another.

52. The tunable dispersion compensator of claim 51 wherein a distance between adjacent ones of the Bragg gratings is greater than the Bragg wavelength.

53. The tunable dispersion compensator of claim 51 wherein a distance between adjacent ones of the Bragg gratings is selected independently of grating parameters that include a Bragg wavelength.

54. The tunable dispersion compensator of claim 47 wherein the tunable Bragg grating is a fiber Bragg grating.

55. The tunable dispersion compensator of claim 47 wherein the tunable Bragg grating is a planar waveguide Bragg grating.

56. The tunable dispersion compensator of claim 55 further comprising a plurality of tunable Bragg transmission gratings located in a common planar waveguide formed on a common substrate, said common planar waveguide being arranged in a circuitous path.

57. The tunable dispersion compensator of claim 56 wherein said circuitous path crisscrosses over the common substrate.

58. The tunable dispersion compensator of claim 57 wherein said plurality of Bragg transmission gratings are located on linear segments of the crisscrossed circuitous path that are parallel to one another.

59. The tunable dispersion compensator of claim 56 wherein said circuitous path is a coiled path.

60. The tunable dispersion compensator of claim 56 wherein said plurality of Bragg transmission gratings are unchirped, apodized gratings.

61. The tunable dispersion compensator of claim 58 wherein said plurality of Bragg transmission gratings are unchirped, apodized gratings.

62. The tunable dispersion compensator of claim 56 wherein said plurality of Bragg transmission grating comprise "N" Bragg gratings, where "N" is an integer between 3 and 100.

63. The tunable dispersion compensator of claim 47 wherein said Bragg transmission grating has photo-induced perturbations in refractive index.

64. The tunable dispersion compensator of claim 55 wherein said Bragg transmission grating is an etched waveguide having a periodic modulation in thickness or width.

65. The tunable dispersion compensator of claim 47 wherein the tunable Bragg grating has a variable Bragg wavelength.

66. The tunable dispersion compensator of claim 65 wherein the tunable Bragg grating is tunable by temperature control.

67. The tunable dispersion compensator of claim 47 further comprising a plurality of Bragg transmission gratings optically coupled to one another and which have polarization dependent dispersion (PDD) values that differ from one another.

68. The tunable dispersion compensator of claim 47 further comprising a plurality of Bragg transmission gratings optically coupled to one another and which have Bragg wavelengths that differ from one another.

69. The tunable dispersion compensator of claim 65 wherein the tunable Bragg grating has a selectively variable length for achieving tunability.

70. The dispersion compensator of claim 20 wherein the tunable Bragg grating has a selectively variable length for achieving tunability.

* * * * *

UNITED STATES PATENT AND TRADEMARK OFFICE
CERTIFICATE OF CORRECTION

PATENT NO. : 6,501,874 B1  Page 1 of 1
DATED : December 31, 2002
INVENTOR(S) : Sergey Frolov et al.

It is certified that error appears in the above-identified patent and that said Letters Patent is hereby corrected as shown below:

Column 4,
Line 30, after "via", insert -- the --.

Column 5,
Line 57, after "in", change "greate" to -- greater --.

Column 6,
Line 11, after "demonstrates", change "there" (first occurrence) to -- that --.

Column 8,
Line 21, after "has", change "be" to -- been --.
Line 32, after "transmission", change "gratings" to -- grating --.

Column 11,
Line 40, after "Thus", delete "a".

Column 12,
Line 2, after "transmission", change "grating" to -- gratings --.

Column 13,
Line 8, after "apodized", change "grating" to -- gratings --.
Line 10, after "unchirped", change "grating" to -- gratings --.

Column 14,
Line 58, after "transmission", change "grating" to -- gratings --.

Signed and Sealed this

Twenty-fourth Day of June, 2003

JAMES E. ROGAN
*Director of the United States Patent and Trademark Office*